United States Patent [19]
Endres et al.

[11] Patent Number: 5,416,141
[45] Date of Patent: May 16, 1995

[54] CATIONIC MODIFIED LAYER COMPOUNDS

[75] Inventors: Helmut Endres, Langenfeld; Frido Loeffelholz; Peter Wedl, both of Bremerhaven; Kurt Worschech, Lostedt; Angela Hansen, Duesseldorf; Guenther Geismar, Krefeld, all of Germany

[73] Assignee: Henkel Kommanditgesellschaft auf Aktien, Duesseldorf, Germany

[21] Appl. No.: 142,402

[22] PCT Filed: May 15, 1992

[86] PCT No.: PCT/EP92/01076

§ 371 Date: Jan. 24, 1994

§ 102(e) Date: Jan. 24, 1994

[87] PCT Pub. No.: WO92/20732

PCT Pub. Date: Nov. 26, 1992

[30] Foreign Application Priority Data

May 24, 1991 [DE] Germany .................. 41 17 035.0

[51] Int. Cl.$^6$ ............................................. C08K 9/04
[52] U.S. Cl. ........................... 524/109; 423/268; 423/274; 423/306; 423/419.1; 524/151; 524/153; 524/310; 524/436; 524/386
[58] Field of Search ............. 423/274, 268, 419 P, 423/306; 524/310, 109, 151, 153, 436, 386

[56] References Cited

U.S. PATENT DOCUMENTS

| | | | |
|---|---|---|---|
| 4,085,088 | 4/1978 | Miyata et al. | 524/436 |
| 4,284,762 | 8/1981 | Miyata et al. | 524/436 |
| 4,299,759 | 11/1981 | Miyata et al. | 524/436 |
| 4,379,882 | 4/1983 | Miyata | 524/436 |
| 4,539,195 | 9/1985 | Schanz et al. | 423/419 |
| 4,675,356 | 6/1987 | Miyata | 524/436 |
| 4,751,261 | 6/1988 | Miyata et al. | 524/436 |
| 5,106,898 | 4/1992 | Nosu et al. | 524/436 |
| 5,143,965 | 9/1992 | Mertz | 524/436 |
| 5,234,981 | 8/1993 | Arfiche et al. | 524/436 |

FOREIGN PATENT DOCUMENTS

| | | |
|---|---|---|
| 256872 | 2/1988 | European Pat. Off. . |
| 362012 | 4/1990 | European Pat. Off. . |
| 421933 | 4/1991 | European Pat. Off. . |
| 3306822 | 8/1984 | Germany . |

*Primary Examiner*—Veronica P. Hoke
*Attorney, Agent, or Firm*—Ernest G. Szoke; Wayne C. Jaeschke; John Daniel Wood

[57] ABSTRACT

Halogen-containing synthetic resins can be stabilized with calcium and/or zinc soaps. Co-stabilizers are necessary for enhancing their stabilizing effect. The invention relates to special cationic layered hydrotalcite compounds having a specific BET surface of at least 50 m$^2$/g which are modified with polyols, epoxidized esters, full and partial esters of polyols and/or phosphites, to a process for their production and to their use as co-stabilizers for halogen-containing synthetic resins stabilized with calcium and/or zinc salts.

28 Claims, No Drawings

CATIONIC MODIFIED LAYER COMPOUNDS

BACKGROUND OF THE INVENTION

1. Field of the Invention

This invention relates to special cationic layer compounds having a specific BET surface of at least 50 m$^2$/g which are modified with polyols, epoxidized esters, full and partial esters of polyols and/or phosphites, to a process for their production and to their use as co-stabilizers for halogen-containing synthetic resins stabilized with calcium and/or zinc salts.

2. Discussion of Related Art

It is known that halogen-containing synthetic resins or molding compounds produced from them tend to degrade or decompose on exposure to heat or ultraviolet light. To counteract this, heavy metal compounds based on lead, tin, barium and/or cadmium are normally used. For reasons of factory hygiene, however, there is a need to replace these thoroughly effective stabilizers by less health-damaging materials. Possible alternative stabilizers to the heavy metal compounds are, for example, calcium and zinc soaps, but unfortunately they do not perform as well as the heavy metal compounds so that co-stabilizers have to be used in order to enhance their stabilizing effect.

German patent DE-C-30 19 632 describes the use of hydrotalcites for inhibiting the thermal or ultraviolet degradation of halogen-containing thermoplastic resins. This patent specification discloses test results which show that, when readily commercially available hydrotalcites are incorporated, for example, in vinyl chloride resins, they accelerate the dechlorination of the resins on heating or even cause decomposition, blackening or foaming of the resins. In addition, it was found that these hydrotalcites show poor dispersibility in the resins and adversely affect the rheological properties of the resins during molding and also the appearance of the molded products obtained. These test results are attributed to the small crystal size of the usual hydrotalcites and to the large specific BET surface of at least about 50 m$^2$/g and the coverage of the hydrotalcite particles with water. Accordingly, it is proposed in German patent DE-C-30 19 632 to use hydrotalcites which have a large crystal size and a specific BET surface of no larger than 30 m$^2$/g and which may optionally be coated with an anionic surfactant, such as sodium stearate. European patent application EP-A-189 899 also describes resin compositions containing hydrotalcites having specific BET surfaces below 30 m$^2$/g. It is known from this European patent application that the hydrotalcites can be modified with higher fatty acid esters, anionic surfactants and coupling agents of the silane or titanium type in order to improve the compatibility of the hydrotalcite with the resins. According to European patent application EP-A-189 899, the hydrotalcites are said to be modified by mechanical mixing of the hydrotalcites with the modifying agents in pure or dissolved form.

However, cationic layer compounds having such small specific surfaces can only be obtained at considerable expense because the crystallization of the solid from the aqueous phase has to take place in a pressure reactor at temperatures well above the normal boiling point of water. This involves considerable outlay on equipment and leads to an unsatisfactory volume/time yield on account of the long crystallization times. In addition, the use of hydrotalcites having small specific surfaces is attended by the disadvantage that hydrogen chloride given off during the thermal decomposition of vinyl chloride resins can only be trapped over a very small surface.

European patent application EP-A-207 811 describes monodisperse cationic layer compounds modified with polyethylene glycol or glycerol which are supposed to be used as thickeners for water-based drilling fluids. It is proposed in this patent application to add the modifying additives to the cationic layer compounds already formed before the drying step in order to improve their dispersibility in water. However, modified cationic layer compounds produced in this way have been found to be virtually unuseable as co-stabilizers in halogen-containing synthetic resins.

DESCRIPTION OF THE INVENTION

The problem addressed by the present invention was to provide co-stabilizers for halogen-containing synthetic resins which —would be compatible with calcium and/or zinc compounds, —would be dispersible in halogen-containing synthetic resins without adversely affecting their rheological properties and —would be capable of effectively trapping the decomposition products of halogen-containing synthetic resins.

The present invention relates to cationic layer compounds corresponding to general formula I in which $M^{(II)}$ represents at least one divalent metal ion, $M^{(III)}$ represents at least one trivalent metal ion, $A^{n-}$ represents an acid anion having a charge n (n=1, 2 or 3), with the proviso that $1<x<5$, $0 \leq z<y$, $(y+nz)=2x+3$ and $0<m<10$, which have a specific BET surface of at least 50 m$^2$/g and which are modified with one or more additives selected from the following groups:

A) polyols containing 3 to 30 carbon atoms and at least two hydroxyl groups,

B) esters of partly and completely epoxidized unsaturated carboxylic acids containing 6 to 22 carbon atoms, C) full and partial esters of polyols containing 3 to 30 carbon atoms and 2 to 12 hydroxyl groups with carboxylic acids containing 6 to 22 carbon atoms and D) alkyl and aryl phosphites, being obtainable by I) precipitation of layer compounds corresponding to formula I from aqueous solutions or suspensions containing the ions $M^{(II)}$, $M^{(III)}$ and $A^{n-}$ in the presence of one or more additives selected from groups A) to D), drying and optionally redrying and, if desired, IIa) intensive mixing of the product obtained with one or more other, liquid or low-melting, dispersing additives selected from groups A) to D) or IIb) grinding of the product with one or more other additives selected from groups A) to D) in the presence of polar organic solvents or water, drying and optionally redrying.

The unmodified cationic layer compounds corresponding to general formula I are compounds known per se of which the structure and preparation are described, for example, by W. T. Reichle in Chemtec (January 1986), pages 58 to 63. Cationic layer compounds corresponding to general formula I in which $M^{(II)}$ represents at least one divalent metal ion selected from the group consisting of magnesium, calcium, zinc, barium and strontium, are preferred for the purposes of the invention. In a preferred embodiment, $M^{(II)}$ represents only one divalent metal ion from the group mentioned, more particularly magnesium. In general formula I, $M^{(III)}$ best represents at least one trivalent metal ion selected from the group consisting of aluminium, bismuth, antimony, boron, gallium and indium and, preferably, only one trivalent metal ion from this group, more preferably aluminium. Cationic layer compounds corresponding to general formula I, in which $A^{n-}$ represents an acid anion having a charge of n selected from the group of anions consisting of carbonate, hydrogen carbonate, perchlorate, acetate, nitrate, tartrate, oxalate, hydroxide and iodide, preferably carbonate, are most particularly preferred. Where reference is made to at least one divalent or at least one trivalent metal ion in the explanation of formula I above, it means that different difunctional or trifunctional metal ions may also be present alongside one another in the cationic layer compound. The indices x, y and z and m may represent whole or broken numbers within the limits mentioned above; z may also be zero. Cationic layer compounds corresponding to general formula I, in which $M^{(II)}$ represents magnesium, $M^{(III)}$ represents aluminium and $A^{n-}$ represents carbonate, are particularly advantageous. Examples of suitable cationic layer compounds are synthetic hydrotalcites which may also be called basic aluminium/magnesium carbonates and which may be obtained by the processes described in DE-B-15 92 126 and in DE-A-20 61 114 or DE-A 29 05 256. Hydrotalcites corresponding to the formula $[Mg_4Al_2(OH)_{12}]\cdot(CO_3)\cdot mH_2O$, where m is as already defined, which may be produced in accordance with DE-C-33 06 822 are most particularly preferred. According to DE-C-33 06 822, hydrotalcites corresponding to the formula $[Mg_6Al_2(OH)_{12}](CO_3)_3\cdot 4H_2O$ are obtained by reaction of aluminium hydroxide with magnesium hydroxide or magnesium oxide in the presence of basic magnesium carbonate as carbonate ion donor at a temperature of 50° C. to 100° C. and subsequent spray drying of the suspension. According to the invention, however, the production of the particularly preferred hydrotalcites is not confined to this particular process. Thus, the reaction may also take place in the presence of other carbonate salts, although this is less preferred because of the introduction of foreign ions. In addition, the hydrotalcites may also be recovered from the suspension by other standard separation and drying processes, although spray drying is preferred. The ratios in which magnesium, aluminium and/or carbonate ions are used can also be varied.

Cationic layer compounds produced by any of these processes have a specific BET surface of at least 50 $m^2/g$ and preferably in the range from 70 to 180 $m^2/g$. According to the invention, the expression "specific BET surface" corresponds to the definition given in Römpp's Chemie Lexikon, Vol. 1, 8th Edition, 1979, page 423.

According to the invention, the cationic layer compounds are modified in situ with one or more additives from groups A) to D) during their production. This is explained in the following with reference by way of example to the particularly preferred hydrotalcite in accordance with DE-C-33 06 822. The additives A) to D) may be added either before or together with magnesium hydroxide and/or magnesium oxide to an aqueous solution or suspension of aluminium hydroxide or before or together with aluminium hydroxide to an aqueous solution or suspension of magnesium hydroxide and/or magnesium oxide.

The additives are best added to an aqueous suspension of aluminium hydroxide with stirring at room temperature (15° to 25° C.) before the reaction with magnesium hydroxide and/or magnesium oxide, preferably magnesium oxide, takes place. Reaction temperatures of 50 to 100° C. are recommended in order to accelerate the subsequent reaction. The carbonate ions are introduced in the form of their salts, preferably as magnesium hydroxycarbonate, at the latest together with the magnesium hydroxides and/or magnesium oxide. The stoichiometric quantities of magnesium, aluminium and carbonate ions are determined by the desired hydrotalcite and can be worked out from general formula I.

The slurry formed during the reaction is then dried by any of the known methods, preferably by spray drying. Drying is best carried out at temperatures which exceed the boiling point of the additives A) to D) by no more than 10° C. and, more particularly, not at all. In some cases, the additional removal of water by redrying, which is advantageously carried out at temperatures of 110° to 280° C., for example in a drying cabinet, leads to improved cationic layer compounds according to the invention. Production in accordance with I) gives cationic layer compounds which are modified very homogeneously with the additives to be described hereinafter.

If desired, the cationic layer compounds produced as described in I) may then be modified with at least one other, liquid or low-melting, dispersing additive selected from groups A) to D) by intensive mixing either at room temperature (15° to 25° C.) or at a temperature below the decomposition temperatures of the cationic layer compounds and/or the additives, preferably at a temperature below 300° C. (IIa). In the context of the invention, low-melting additives are understood to be additives which can be converted into the liquid state at temperatures below the decomposition temperatures mentioned above under normal pressure. Instead of being intensively mixed in accordance with IIa), the cationic layer compounds produced as described in I) may, if desired, subsequently be ground with one or more additives also selected from groups A) to D) in the presence of polar organic solvents or water, preferably in grinding mills and, more preferably, in a ball mill, dried and optionally redried (IIb). The drying or redrying step is best carried out in the same way as described for I). In the context of the invention, polar organic solvents are understood to be hydrocarbons which are liquid at room temperature (15° to 25° C.) and which bear at least one substituent which is more electronegative than carbon, including chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, lactic acid ethyl ester, 2-methoxyethyl acetate, tetrahydrofuran, ethylene glycol monomethyl ether, diethylene glycol monoethyl ether.

The additives of group A) are polyols containing at least two hydroxyl groups and a total or 3 to 30 carbon atoms. Examples of such polyols are diols containing 3 to 30 carbon atoms, such as butanediols, hexanediols, dodecanediols, and polyols, such as trimethylol propane, pentaerythritol, glycerol and technical oligomer mixtures thereof having average degrees of condensation of 2 to 10. Polyols containing 3 to 30 carbon atoms which bear at least one hydroxyl group or an ether oxygen every three carbon atoms, such as glycerol and/or technical oligoglycerol mixtures having average degrees of condensation of 2 to 10, are most particularly preferred.

The additives of group B) are esters of partly or completely epoxidized unsaturated carboxylic acids containing 6 to 22 carbon atoms. Suitable esters are esters of monohydric, dihydric and/or trihydric alcohols which are completely esterified with epoxidized unsaturated carboxylic acids containing 6 to 22 carbon atoms, such as methyl, 2-ethylhexyl, ethylene glycol, butanediol, neopentyl glycol, glycerol and/or trimethylol propane esters of epoxidized lauroleic acid, palmitoleic acid, oleic acid, ricinoleic acid, linoleic acid and/or linolenic acid. Esters of trihydric alcohols and completely epoxidized unsaturated carboxylic acids containing 12 to 22 carbon atoms are preferred, esters of glycerol with completely epoxidized unsaturated carboxylic acids containing 12 to 22 carbon atoms being particularly preferred. The carboxylic acid component may be derived, for example, from palmitoleic acid, oleic acid, elaidic acid, petroselic acid, ricinoleic acid, linolenic acid, gadoleic acid or erucic acid. The unsaturated carboxylic acids are epoxidized by known methods. As usual in oleochemistry, the epoxidized carboxylic acid glycerides may also be the technical mixtures obtained by epoxidation of natural unsaturated fats and oils. Epoxidized rapeseed oil, epoxidized unsaturated soybean oil and/or epoxidized sunflower oil from new crops is/are preferably used.

The additives of group C) are full or partial esters obtained by the relevant methods of preparative organic chemistry, for example by acid-catalyzed reaction of polyols with carboxylic acids. Suitable polyol components are any of those already discussed in connection with group A). The acid component is preferably selected from aliphatic, saturated and/or unsaturated carboxylic acids containing 6 to 22 carbon atoms, such as caproic acid, caprylic capric acid, lauric acid, myristic acid, palmitic acid, palmitoleic acid, stearic acid, oleic acid, ricinoleic acid, linoleic acid, linolenic acid, behenic acid or erucic acid. As usual in oleochemistry, the carboxylic acid component may also be a technical mixture of the type obtained in the pressure hydrogenation of natural fats and oils. Partial esters of glycerol and, in particular, technical oligoglycerol mixtures having average degrees of condensation of 2 to 10 and saturated and/or unsaturated aliphatic carboxylic acids containing 6 to 22 carbon atoms are preferred.

Finally, alkyl and aryl phosphites, preferably those corresponding to general formula II

(II)

in which $R^1$, $R^2$ and $R^3$ independently of one another represent a $C_{1-18}$ alkyl radical or a phenyl radical, may be used as the additives of group D). Typical examples of group D) additives are tributyl phosphite, triphenyl phosphite, dimethylphenyl phosphite and/or dimethylstearyl phosphite. Diphenyldecyl phosphite is preferred.

According to the invention, one or more additives from groups A) to D) is/are used in total quantities of 0.5 to 15% by weight, based on the cationic layer compounds, in the production of the cationic layer compounds by method I). Where the cationic layer compounds are produced by a combination of method I) with IIb), the total quantity of additives is selected so that it is in the range from 1.0 to 15% by weight, based on cationic layer compounds. If the cationic layer compounds are produced by a combination of method I) with IIa), the modified cationic layer compounds produced by method I) may additionally be mixed in method IIa) with 3 to 100% by weight of the additives mentioned, based on the cationic layer compound.

The present invention also relates to a process for the production of cationic layer compounds corresponding to general formula I

(I)

in which $M^{(II)}$ represents at least one divalent metal ion, $M^{(III)}$ represents at least one trivalent metal ion, $A^{n-}$ represents an acid anion having a charge n (n=1, 2 or 3), with the proviso that $1<x<5$, $0 \leq z<y$, $(y+nz)=2x+3$ and $0<m<10$, which have a specific BET surface of at least 50 m²/g and which are modified with one or more additives selected from the following groups:

A) polyols containing 3 to 30 carbon atoms and at least two hydroxyl groups,

B) esters of partly and completely epoxidized unsaturated carboxylic acids containing 6 to 22 carbon atoms, C) full and partial esters of polyols containing 3 to 30 carbon atoms and 2 to 12 hydroxyl groups with carboxylic acids containing 6 to 22 carbon atoms and D) alkyl and aryl phosphites, characterized in that I) layer compounds corresponding to formula I are precipitated from aqueous solutions or suspensions containing the ions $M^{(II)}$, $M^{(III)}$ and $A^{n-}$ in the presence of one or more additives selected from groups A) to D), dried and optionally redried and, if desired, the product obtained is IIa) intensively mixed with one or more other, liquid or low-melting, dispersing additives selected from groups A) to D) or IIb) is ground with one or more other additives selected from groups A) to D) in the presence of polar organic solvents or water, dried and optionally redried.

Particulars of the process conditions and the compounds can be found in the foregoing description.

The present invention also relates to the use of cationic layer compounds of the described type as co-stabilizers for halogen-containing synthetic resins stabilized with calcium and/or zinc salts of carboxylic acids containing 6 to 22 carbon atoms. The cationic layer compounds according to the invention are preferably used as co-stabilizers in halogen-containing synthetic resins, more particularly in PVC. To this end, the modified cationic layer compounds are added in quantities of 0.01 to 5 parts by weight and preferably in quantities of 0.1 to 3 parts by weight, based on 100 parts by weight resin. In general, they are mechanically mixed with the resins present in granular form before being subjected to processing, for example by calendering or extrusion. Commercially available zinc and/or calcium salts of carboxylic acids containing 6 to 22 carbon atoms are incorporated as conventional stabilizers, generally at the same time as the modified cationic layer compounds. Other conventional additives, such as the heat stabilizers described in EP-A-189 899, may of course also be used. The quantities in which the stabilizers and co-stabilizers are used may be varied as required, with the proviso that the total addition of stabilizer makes up from 0.5 to 5 parts by weight per 100 parts by weight resin. Accordingly, the minimum quantity of modified cationic layer compound is at least 0.01% by weight.

The effect of zinc and/or calcium soaps as stabilizers for halogen-containing synthetic resins is enhanced by the use of the surface-modified cationic layer compounds according to the invention. In addition, the modified cationic layer compounds as co-stabilizers may readily be incorporated in the halogen-containing synthetic resins without adversely affecting their rheological properties.

EXAMPLES

A) Preparation of the modified cationic layer compounds

Example 1

300 g of an aluminiumhydroxide gel having an aluminium content of 0.56 mol were stirred with 800 g fully deionized water (FD water) at room temperature. The additives or additive mixtures shown in Table 1 were then added in the quantities indicated and the mixture was heated to 80° C. 61.6 g magnesium hydroxide carbonate, corresponding to 0.64 mol magnesium, and 17.6 g magnesium oxide, corresponding to 0.44 mol magnesium, in powder form were added at the temperature of 80° C. The mixture was then stirred under reflux for 2 hours and, after cooling, was directly spray-dried using a Büchi laboratory spray dryer (air entry temperature 130° to 160° C., exit temperature 100° to 105° C.). In some cases, the powder-form spray-dried product was redried for 2 hours in a laboratory drying cabinet.

The additives or additive mixtures are listed in Table 1. The quantities indicated for the additives represent % by weight, based on the theoretical yield of cationic layer compound corresponding to the formula [Mg$_4$Al$_2$(OH)$_{12}$](CO$_3$)·4H$_2$O. The temperature indicated is the redrying temperature in °C.

TABLE 1

| | Cationic layer compound modified with | | | |
|---|---|---|---|---|
| Ex. | Additive | Quantity | Redrying in °C. | BET |
| 1A | Glycerol | 2.2 | 200 | 96 |
| 1B | Pentaglycerol with an average degree of condensation of 5, an average molecular weight of 380 and a hydroxyl value of approx. 1012 | 2.2 | 110 | 107 |
| 1C | Glycerol | 1 | 200 | n.d. |
| 1D | Glycerol | 3.2 | 200 | n.d. |
| 1E | Glycerol | 8.8 | — | n.d. |
| 1F | Epoxidized soybean oil (saponification value SV 125, epoxide oxygen content EO 5.8% by weight) | 2.2 | 200 | n.d. |
| 1G | Glycerol and epoxidized soybean oil (SV 125, EO 5.8) | 2.2 2.2 | 200 | n.d. | n.d. = not determined

Example 2

2.2 g of a technical diglycerol CI$_{12-18}$ coconut oil fatty acid monoester were added to 20 g of the cationic layer compound of Example 1A in a mixer and homogenized therewith for 1 minute.

Comparison Substances

C1

"Alcamizer ® 4" commercial PVC stabilizer of Kyowa Chemical Ind. based on hydrotalcite having a specific BET surface of 8 m$^2$/g (see "Introduction of Alcamizer" Kyowa Chem Ind. Co. Ltd., pages 2–36, Isuriganecho, Higashi-Ku, Osaka).

C2

Spray-dried hydrotalcite prepared in accordance with Example 1 but with no addition of additives and with no redrying.

C3

Spray-dried hydrotalcite prepared in accordance with Example 1, but with no addition of additives. After spray-drying, this hydrotalcite was redried for 2 hours at 200° C. in a laboratory drying cabinet.

C4

Hydrotalcite with glycerol, commercial product BHC ® of Westbridge Oilfield Products Inc.; for further particulars, see manufacturer's leaflet "Technical Information BHC ™, The Drilling Fluid System for Bore Hole Control".

B) Application Examples

Sheeted-out compounds containing stabilizer mixtures of 0.5 part by weight zinc stearate,
0.5 part by weight calcium stearate,
0.2 part by weight stearoyl benzoyl methane (Rhodiastab ® 50)
1.0 part by weight of the substances of Examples 1 and 2 according to the invention and comparison substances 1 to 4 based on 100 parts by weight suspension polyvinyl chloride having a K value of 65, were tested for "static stability".

To this end, polyvinyl chloride molding compounds containing stabilizer mixtures were processed to test strips on co-rotating laboratory mixing rolls measuring 450×220 mm (Berstorff) at a roll temperature of 170° C. and at a roll speed of 12.5 r.p.m. The approx. 0.5 mm thick strips were cut into square test specimens (edge length 10 mm) which were then exposed to a temperature of 180° C. in a drying cabinet having 6 rotating trays (Heraeus FT 420 R). Samples were taken at 15 minute intervals and examined for changes in color. Discoloration was evaluated on a scale of 1 (colorless) to 10 (black, stability failure).

The results are set out in Table 2.

TABLE 2

| | | Stability of molding compounds | | | | | | | |
|---|---|---|---|---|---|---|---|---|---|
| Additive of | | Color mark after minutes | | | | | | | |
| Example | Example | 0 | 15 | 30 | 45 | 60 | 75 | 90 | 105 | 120 |
| A | 1A | 1 | 2 | 3 | 5 | 6 | 9 | 10 | | |
| B | 1B | 1 | 3 | 4 | 5 | 7 | 9 | 10 | | |
| C | 1C | 1 | 1 | 2 | 3 | 4 | 6 | 8 | 10 | |
| D | 1D | 1 | 1 | 2 | 3 | 5 | 7 | 9 | 10 | |

TABLE 2-continued

Stability of molding compounds

| Example | Additive of Example | Color mark after minutes | | | | | | | |
|---|---|---|---|---|---|---|---|---|---|
| | | 0 | 15 | 30 | 45 | 60 | 75 | 90 | 105 | 120 |
| E | 1E | 1 | 3 | 3 | 4 | 6 | 8 | 10 | | |
| F | 1F | 1 | 1 | 2 | 3 | 4 | 7 | 10 | | |
| G | 1G | 1 | 2 | 2 | 3 | 4 | 6 | 8 | 9 | 10 |
| H | 2 | 1 | 2 | 3 | 5 | 6 | 7 | 10 | | |
| I | C1 | 1 | 2 | 3 | 5 | 7 | 10 | | | |
| J | C2 | 1.5 | 2 | 4 | 8 | 10 | | | | |
| K | C3 | 1 | 2 | 4 | 8 | 10 | | | | |
| L | C4 | 2 | 7 | 10 | | | | | | |

We claim:

1. A process for the production of a composition of matter useful as a co-stabilizer for halogen-containing synthetic resins, said process comprising:

a) precipitating a cationic layer compound corresponding to general formula:

$$[M^{(II)}_x M^{(III)}(OH)_y](A^{n-})_z \cdot mH_2O \quad (I)$$

in which $M^{(II)}$ represents at least one divalent metal ion,
$M^{(III)}$ represents at least one trivalent metal ion,
$A^{n-}$ represents an acid anion having a charge n with n=1, 2 or 3,
with the proviso that $1 < x < 5$, $0 < z < y$, $(y+nz) = 2x+3$ and $0 \leq m < 10$, said cationic layer compound having a specific BET surface of at least 50 m²/g, from an aqueous solution or suspension containing the ions $M^{(II)}$, $M^{(III)}$ and $A^{n-}$ in the presence of one or more additives selected from the following groups:

—polyols containing 3 to 30 carbon atoms and at least two hydroxyl groups,
—esters of partly or completely epoxidized unsaturated carboxylic acids containing 6 to 22 carbon atoms,
—full or partial esters of polyols containing 3 to 30 carbon atoms and 2 to 12 hydroxyl groups with carboxylic acids containing 6 to 22 carbon atoms, and
—alkyl or aryl phosphites, and b) drying the compound so precipitated.

2. A process as claimed in claim 1 further comprising intensively mixing the dried product with one or more additional, liquid or low-melting, dispersing additives selected from the group consisting of —polyols containing 3 to 30 carbon atoms and at least two hydroxyl groups,
—esters of partly or completely epoxidized unsaturated carboxylic acids containing 6 to 22 carbon atoms,
—full or partial esters of polyols containing 3 to 30 carbon atoms and 2 to 12 hydroxyl groups with carboxylic acids containing 6 to 22 carbon atoms, and
—alkyl or aryl phosphites.

3. A process as claimed in claim 1 further comprising, after said drying, grinding the dried product in the presence of a solvent or water containing one or more additional additives selected from the group consisting of —polyols containing 3 to 30 carbon atoms and at least two hydroxyl groups,
esters of partly or completely epoxidized unsaturated carboxylic acids containing 6 to 22 carbon atoms,
—full or partial esters of polyols containing 3 to 30 carbon atoms and 2 to 12 hydroxyl groups with carboxylic acids containing 6 to 22 carbon atoms, and
—alkyl or aryl phosphites.

4. A process as claimed in claim 1 wherein $M^{(II)}$ represents a divalent magnesium ion or $M^{(III)}$ represents a trivalent aluminum ion or $A^{n-}$ represents a carbonate ion.

5. A process as claimed in claim 1 wherein said layer compound corresponding to general formula I is a hydrotalcite.

6. A process as claimed in claim 1 wherein said additive is selected from the group consisting of $C_{3-30}$ polyols containing at least one hydroxyl group or an ether oxygen atom for every 3 C atoms.

7. A process as claimed in claim 6 wherein said additive is selected from the group consisting of glycerol and/or technical oligoglycerol mixtures having average degrees of condensation of 2 to 10.

8. A process as claimed in claim 1 wherein additive is selected from the group consisting of esters of trihydric alcohols and completely epoxidized unsaturated carboxylic acids containing 12 to 22 carbon atoms.

9. A process as claimed in claim 1 wherein said esters are selected from the group of epoxidized soybean oil, epoxidized rapeseed oil and epoxidized sunflower oil.

10. A process as claimed in claim 1 wherein said additive is selected from the group consisting of partial esters of glycerol, technical oligoglycerol mixtures having average degrees of condensation of 2 to 10 and saturated and/or unsaturated aliphatic carboxylic acids containing 6 to 22 carbon atoms.

11. A process as claimed in claim 1 wherein said additive is selected from the group consisting of aryl and/or alkyl phosphites corresponding to general formula:

$$\begin{array}{c} OR^3 \\ | \\ R^1-O-P-OR^2 \end{array} \quad (II)$$

in which $R^1$, $R^2$ and $R^3$ independently of one another represent a $C_{1-8}$ alkyl radical or a phenyl radical.

12. A process as claimed in claim 1 wherein said additive comprises from 0.5% to 15% by weight of said cationic layer compound.

13. A composition of matter produced by the process of claim 1.

14. A composition of matter as claimed in claim 13 further comprising a calcium and/or zinc salt of a carboxylic acid containing 6 to 22 carbon atoms.

15. A method of co-stabilizing a halogen-containing resin comprising mixing a halogen-containing synthetic resin with a composition as claimed in claim 13.

16. A method as claimed in claim 15 further comprising mixing into said halogen-containing synthetic resin a calcium and/or zinc salt of a carboxylic acid containing 6 to 22 carbon atoms.

17. A method as claimed in claim 15 wherein said halogen-containing synthetic resin is polyvinyl chloride.

18. A method as claimed in claim 15 wherein said composition is added in quantities from 0.01 to 5 parts by weight per 100 parts by weight of said halogen-containing synthetic resin.

19. A method as claimed in claim 15 wherein said composition is added in quantities from 0.1 to 3 parts by weight per 100 parts by weight of said halogen-containing synthetic resin.

20. A resin composition comprising a halogen-containing synthetic resin and a composition produced by the process of claim 1.

21. A composition as claimed in claim 20 wherein said halogen-containing synthetic resin is polyvinyl chloride.

22. A composition as claimed in claim 20 wherein said composition of matter produced by said process comprises from 0.01 to 5 parts by weight per 100 parts by weight of said halogen-containing synthetic resin.

23. A composition as claimed in claim 20 wherein said composition of matter produced by said process comprises from 0.1 to 3 parts by weight per 100 parts by weight of said halogen-containing synthetic resin.

24. A composition as claimed in claim 20 further comprising a halogen-containing synthetic resin and a calcium and/or zinc salt of a carboxylic acid containing 6 to 22 carbon atoms.

25. A process as claimed in claim 1 wherein said BET surface area is from 70 to 180 $m^2/g$.

26. A composition as claimed in claim 13 wherein the BET surface area of the cationic layer compound in said composition is from 70 to 180 $m^2/g$.

27. A method as claimed in claim 15 wherein the BET surface area of the cationic layer compound in said composition is from 70 to 180 $m^2/g$.

28. A resin composition as claimed in claim 20 wherein the BET surface area of the cationic layer compound in said composition is from 70 to 180 $m^2/g$.

* * * * *